United States Patent [19]

Bancroft

[11] 3,777,181

[45] Dec. 4, 1973

[54] PHASE DISCATECTOR

[75] Inventor: Charles F. Bancroft, Sherman Oaks, Calif.

[73] Assignee: Hughes Aircraft Company, Culver City, Calif.

[22] Filed: Apr. 27, 1972

[21] Appl. No.: 248,095

Related U.S. Application Data

[62] Division of Ser. No. 111,408, Feb. 1, 1971, abandoned.

[52] U.S. Cl. .................. 307/232, 307/321, 328/134, 329/137

[51] Int. Cl. .................. H03k 5/20

[58] Field of Search .................. 307/232, 321; 328/133–134; 329/137, 138, 166, 204; 332/47

[56] References Cited

UNITED STATES PATENTS

| | | | |
|---|---|---|---|
| 2,901,604 | 8/1959 | Nordstrom et al. | 329/137 |
| 3,265,976 | 8/1966 | Broadhead, Jr. | 328/134 |
| 2,538,040 | 1/1951 | Prichard | 329/138 |
| 3,205,457 | 9/1965 | Bell | 307/321 |
| 2,972,065 | 2/1961 | Hayes, Jr. | 307/321 |
| 2,859,410 | 11/1958 | Bastow | 332/47 |

*Primary Examiner*—John W. Huckert
*Assistant Examiner*—Ro E. Hart
*Attorney*—W. H. MacAllister, Jr. et al.

[57] ABSTRACT

An improved circuit having both frequency discriminator and phase detector functions is disclosed. The circuit functions as a frequency discriminator for signals relatively far removed from a predetermined acquisition frequency range, thereby providing a coarse lock-on for acquisition. After acquisition the circuit functions as a phase detector for phase lock purposes. Thus, the discatector or dual function discriminator-phase detector eliminates the requirement for sweeping or presetting a voltage controlled oscillator when used in a phase lock loop wherein the open loop frequency drifts are larger than the acquisition range of the loop or where multiple channel operation is required.

4 Claims, 4 Drawing Figures

PHASE DISCATECTOR

CROSS-REFERENCE TO RELATED APPLICATION

This is a division of application Ser. No. 111,408, filed Feb. 1, 1971, now abandon.

RELATION TO GOVERNMENT CONTRACT

The invention herein described was made in the course of or under a Contract or Subcontract thereunder with the Department of the Navy.

FIELD OF THE INVENTION

This invention relates to phase lock loops and more specifically to unitary circuits which are capable of providing both discriminator and phase detector functions automatically for use in such loops.

DESCRIPTION OF THE PRIOR ART

Basically, a phase lock loop comprises a phase detector, a low pass filter and a voltage controlled oscillator, the frequency of which is controllable by an external voltage. (See: "Phaselock Techniques", Floyd M. Gardner, John Wiley & Sons, New York, 1966, p. 1 et seq.) The phase detector accepts an input signal and compares it against the phase of a signal generated by the voltage controlled oscillator. An error signal representative of the difference in phase between the two signals is filtered and applied to the voltage controlled oscillator in a manner so as to reduce the error signal to zero. When the circuit is locked the frequency and phase of the voltage controlled oscillator is exactly the same as that of the input signal. An output signal for the loop is derived from a second output tap of the voltage controlled oscillator.

Problems are encountered, however, in applications where the precise frequency of the input signal is not known or where this frequency is subject to rapid variations such as in multichannel operation. In such cases the input signal must be acquired before lock-on can take place. In the past, several techniques have been employed to provide acquisition of the input signal. These techniques are summarized in the above-mentioned treatise of Dr. F. M. Gardner at p. 50 et seq.

Briefly, these techniques generally involve sweeping the frequency of the voltage controlled oscillator periodically over the band of operation until the input signal is acquired. Once the acquisition takes place the sweep source is squelched and the loop remains in lock. Other techniques have also been employed including the use of a separate discriminator in conjunction with the phase detector.

It is an object of the present invention to provide a phase lock loop of simplified design which eliminates certain previously required circuits.

It is another object of the present invention to provide a faster acquisition time for a phase lock loop by eliminating recurring sweeps and pre-set voltage controlled oscillator frequencies.

It is a more specific object of the present invention to provide a phase lock loop circuit having a phase detector which also functions as a frequency discriminator.

It is also common practice in phase lock loops of prior art design to incorporate frequency selective circuits to prevent the loop from locking on to harmonics of the signal frequency. Although the additional circuitry required is not unduly complex, it adds to the overall cost of the phase lock loop.

It is another object of the present invention to provide a phase lock loop requiring no additional frequency selective circuits to eliminate signal harmonic lock-on.

SUMMARY OF THE INVENTION

In accordance with the principles of the present invention, the acquisition of and locking on to a signal of undetermined phase and frequency is accomplished by a phase lock loop circuit. In a preferred embodiment a mixer is provided with an input signal from an outside source and an input from a controllable oscillator in the loop. These two signals are combined and the difference frequency is extracted at the mixer output. The mixer output is then processed by a phase discatector which first functions as a discriminator which produces a d-c output voltage for frequencies other than a predetermined center frequency. The discatector output voltage, in turn, provides a control input for a voltage controlled oscillator. The control voltage is coupled to the voltage controlled oscillator in a manner which tends to change the frequency of the controllable oscillator to reduce the difference frequency to zero. When the frequency of the voltage controlled oscillator and that of the input signal are substantially the same the phase discatector reverts to a phase detector function. The phases of the inputs from the mixer and voltage controlled oscillator are compared and if they are in phase quadrature there is no d-c output, otherwise an error signal is generated to lock the signals in phase quadrature. When the loop has locked on the proper frequency, there will be a zero output from the phase discatector and the output of the controllable oscillator will be synchronized in frequency and phase with the input signal.

These and other objects and features of the present invention will become more readily understood from the following description taken in conjunction with the accompanying drawings in which like numerals refer to like elements and wherein:

DESCRIPTION OF THE PREFERRED EMBODIMENTS

Figure 1:
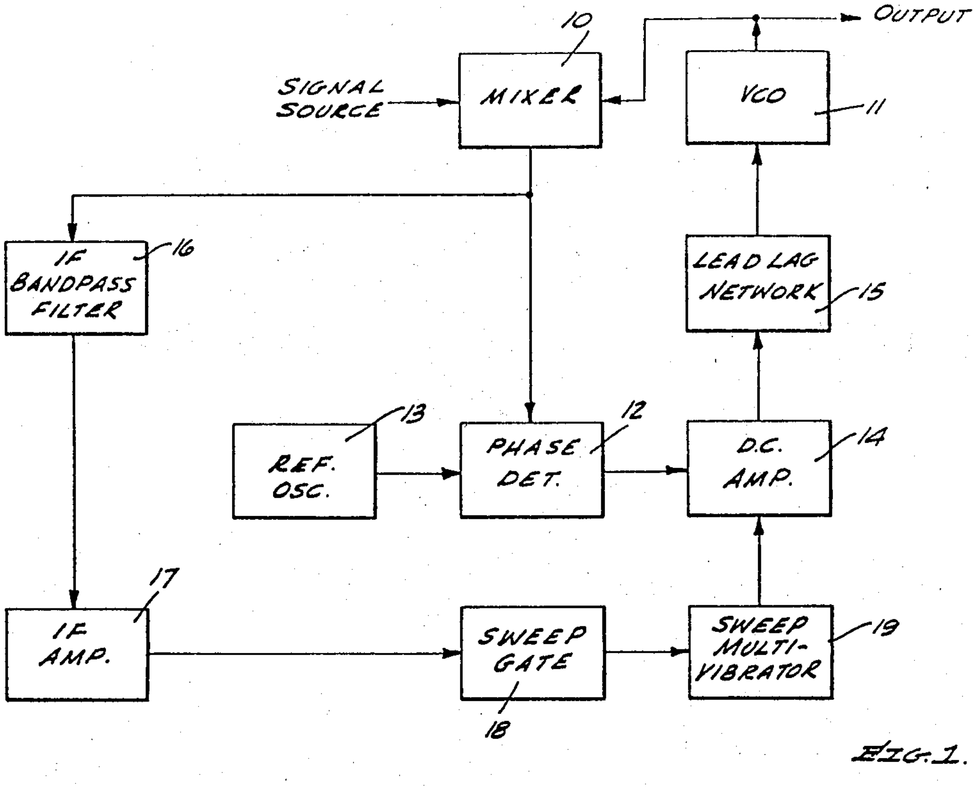
FIG. 1 is a block diagram of a prior phase lock loop circuit included for the purpose of explanation.

FIG. 1 is a block diagram of a phase lock loop circuit of a type well-known in the art. The circuit comprises, a mixer 10 having two inputs and an output, a voltage controlled oscillator (VCO) 11 having an input and an output, a phase detector 12 having two inputs and an output, a reference oscillator 13 having an output, a d-c amplifier 14 having two inputs and an output, a lead-lag network 15 having an input and an output, an i-f band-pass filter 16 having an input and an output, an i-f amplifier 17 having an input and an output, a sweep gate 18 having an input and an output, a sweep multivibrator 19 having an input and an output.

A source of signal input is coupled to one input port of mixer 10, the other input port being coupled to the output port of VCO 11. The output port of mixer 10 is coupled to one input port of phase detector 12 and to the input port of bandpass filter 16. The reference oscillator 13 is, in turn, coupled to the other input port of phase detector 12. The output port of phase detector 12 is coupled to one input port of d-c amplifier 14. The output port of d-c amplifier 14 is coupled to the input port of lead-lag network 15. The output port of lead-lag network 15 is, in turn, coupled to the input port of VCO 11. The output for the entire phase lock loop circuit is derived from the output of VCO 11.

The output port of *i–f* bandpass filter 16 is coupled to the input port of *i–f* amplifier 17. The output port of *i–f* amplifier 17 is, in turn, coupled to the input port of sweep gate 18. The sweep gate 18 output port is coupled to the input port of sweep multivibrator 19 and its output port is coupled to the second input port of d-c amplifier 14.

In operation, when the power is first applied, the sweep multivibrator 19 starts running since there is no signal output from the mixer 10 to activate the sweep gate 18. The sweep multivibrator 19 drives the d-c amplifier 14 over its entire dynamic range which, in turn, causes the VCO 11 to be driven over its frequency range. When the frequency of the VCO 11 equals the intermediate frequency a signal appears $F_{if}$, at the output of the *i–f* bandpass filter 16. This bandpass filter 16 is necessary to prevent the loop from locking onto multiples or submultiples of the *i–f* reference frequency. Simultaneously, there appears a d-c signal at the output of the phase detector 12 which causes the phase lock loop to lock up for a portion of the sweep cycle through the action of the d-c amplifier 14 and the lead-lag network 15. The output of the *i–f* bandpass filter 16 is amplified by the *i–f* amplifier 17 and the output is rectified and applied to the sweep multivibrator 19 as a control voltage. In order to keep this prior art arrangement from locking up on spurious modes, it is the general practice to make the time constant of the sweep gate 18 such that about ten passes of the sweep gate 18 are required to shut off the sweep multivibrator 19. This delay, of course, results in a relatively long acquisition time which the present invention seeks to avoid.

Figure 2:
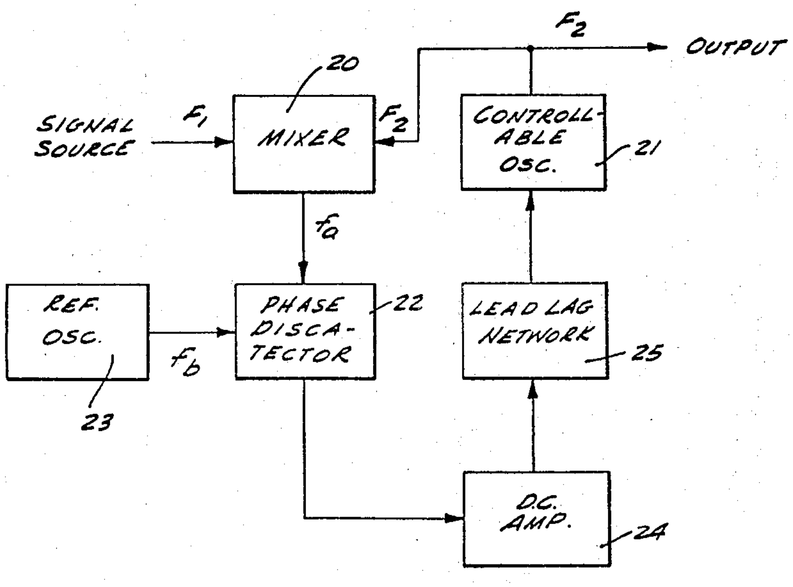
FIG. 2 is a block diagram of an embodiment of the present invention.

FIG. 2 is a block diagram of the phase lock loop in accordance with the principles of the present invention.

The phase lock loop network consists of a mixer 20 having a pair of input ports and one output port, a controllable oscillator 21 having an input and output port, a phase discatector 22 with two input ports and one output port, a reference oscillator 23 having an output port, and a d-c amplifier 24 having an input and an output port, and a lead-lag network 25 having an input and an output port.

A source of signal input is coupled to one of the input ports of mixer 20; the other input port being coupled to the output port of controllable oscillator 21. The output port of mixer 20 is coupled to one of the input ports of phase discatector 22. The other input port of discatector 22 is coupled to the output port of reference oscillator 23. The output port of phase discatector 22 is coupled to the input port of d-c amplifier 24, the output port of which is coupled to the input port of lead-lag network 25. The input port of lead-lag network 25 is coupled to the output port of controllable oscillator 21. The output port of controllable oscillator 21 is coupled to the input port of mixer 20 and also comprises the output port for the phase lock loop circuit.

In operation, the signal source having a frequency $F_1$ is applied as an input to mixer 20. The controllable oscillator 21 having an initial output frequency $F_2$ comprises the other input to mixer 20. For purposes of explanation it will be assumed that $F_1 = F_2 + f_a$. That is, $F_1$ is slightly higher than $F_2$. These signals of frequencies $F_1$ and $F_2$ are mixed by the mixer 20 and the difference frequency $f_a$ is extracted at the output. In the alternative, mixer 20 could also function so that the two frequencies are added and their sum extracted at the output.

The output of mixer 20 at frequency $f_a$ is coupled as an input to the phase discatector 22. The reference oscillator 23 having an output frequency $f_b$ comprises the other input to the phase discatector 22. If the mixer 20 output frequency $f_a$ is below the reference oscillator frequency $f_b$, the discatector will have a negative d-c output signal. If $f_a$ is above $f_b$ the discatector will have a positive d-c output signal. Whenever $f_a$ and $f_b$ are unequal, as before lock-on, the discatector 22 output is due to its discriminator function. When $f_a$ equals $f_b$ the discatector 22 provides a d-c output which may be positive or negative depending solely on the phase detector function of the discatector.

If $f_a$ equals $f_b$ the discatector functions as a phase detector in comparing the phase of $f_a$ and $f_b$. When there is a phase detector other than 90 degrees between $f_a$ and $f_b$ there will be an output from the discatector. If there is a zero degree phase difference between $f_a$ and $f_b$ there will be a positive d-c output. And if there is a 180° difference there will be a negative d-c output. When there is a zero output the loop is said to be "locked on" the signal. If there is a 90° difference there will be a zero output.

The phase discatector 22 therefore has a dual role, that of a phase detector and a frequency discriminator. This dual role is the basis of the nomenclature given to the circuit. The detail functioning of the phase discatector is more fully explained hereinbelow in conjunction with the block diagram of FIG. 3.

The discatector 22 output signal is amplified by the d-c amplifier 24 and applied to the input of lead-lag network 25. The output of the lead-lag network 25 is dependent upon the gain of the phase lock loop at the various frequencies. At frequencies where the gain of the entire loop equals unity, the lead-lag network 25 attenuates the output of the amplifier 24 without shifting the phase of the signal. At frequencies where the loop gain is less than unity the amplifier 24 output is not attenuated. The lead-lag network 25 is therefore a phase-corrected attenuator.

Both the d-c amplifier 24 and the lead-lag network 25 may, if desired, be eliminated from the phase lock loop circuit. If this is done the phase discatector 22 and the controllable oscillator 21 must meet more critical design requirements, in that the controllable oscillator 21 must be sufficiently sensitive to detect slight variations in the discatector 22 output and adjust its frequency accordingly.

As indicated, the output of lead-lag network 25 comprises the control input to controllable oscillator 21. The output frequency of controllable oscillator 21 varies in response to changes in this d-c input. The controllable oscillator 21, for example, can be a voltage controlled oscillator (VCO), whose output frequency is dependent upon the voltage of its input signal. Alternatively, the oscillator frequency can be controlled by the input current as in a current controlled oscillator.

As the signal is acquired, the difference frequency $f_a$ approaches the reference frequency $f_b$. When the two frequencies $f_a$ and $f_b$ are equal and the relative phase difference of these two signals is 90°, the loop is said to be "locked on". When lock-on occurs, the d-c output of phase discatector 22 is zero and the output frequency of the phase lock loop $F_2$ equals $F_1$-$f_b$.

This phase lock loop cannot lock on harmonics of the lock-on frequency because of the discriminator action of the phase discatector. At any frequency other than the predetermined lock-on frequency there will be a d-c output from the discatector, either negative or positive. Thus, if there is an output from the discatector when its input frequency is a harmonic of the lock-on frequency controllable oscillator 21 will be forced to continue its sweep across the band until it reaches the lock-on frequency.

Figure 3:
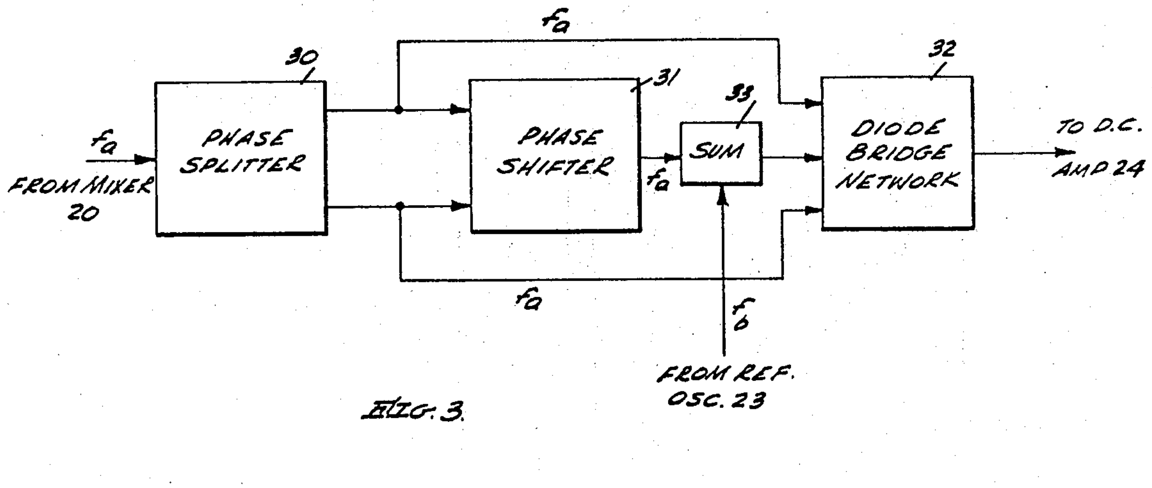
FIG. 3 is a block diagram of the phase discatector circuit of the present invention.

There is shown in FIG. 3, in block diagram, the phase discatector of the present invention. The phase discatector comprises a phase splitter 30 which accepts the difference signal $f_a$ from the mixer and produces a pair of push-pull output signals at $f_a$ and having a relative phase difference of 180°. The push-pull output signals are coupled first to a phase shifter 31 and secondly to a pair of inputs of a diode bridge network 32. The output of phase shifter 31 is coupled to a summing network 33 as is the reference signal from reference oscillator 23. The output of summing network 33 is, in turn, coupled to another input of diode bridge network 32. The output of the diode bridge network comprises the phase discatector output and is coupled to the d-c amplifier as shown in FIG. 2.

The operation of the phase discatector in its frequency discriminator mode is as follows: The difference signal at frequency $f_a$ is applied to the input port of phase splitter 30. As mentioned hereinabove, the phase splitter output comprises two signals at frequency $f_a$ but having a relative phase difference of 180°.

These two push-pull output signals are applied to the push-pull input ports of phase shifter 31 and diode bridge network 32, respectively. Phase shifter 31, in response to the push-pull input, produces a single output signal at frequency $f_a$, the phase of which varies between zero and 180° as the frequency $f_a$ varies over the frequency range of discriminator operation. This varying phase of the phase shifter output coupled through summing network 33, when compared with the push-pull output of phase splitter 30 in diode bridge network 32 results in discriminator action with a cross-over frequency $f_c$. At input frequencies other than cross over the phase shift in the output frequency will be either above or below 90° depending on the particular construction of the phase shifter.

With the signal from the reference oscillator at frequency $f_b$ applied to the diode bridge network through summing network 33 considered, the phase detector operation can be seen. A zero degree phase difference between the phase of the output signal of phase shifter 31 and the phase of the reference signal input $f_b$ results in zero output from the phase discatector.

Figure 4:
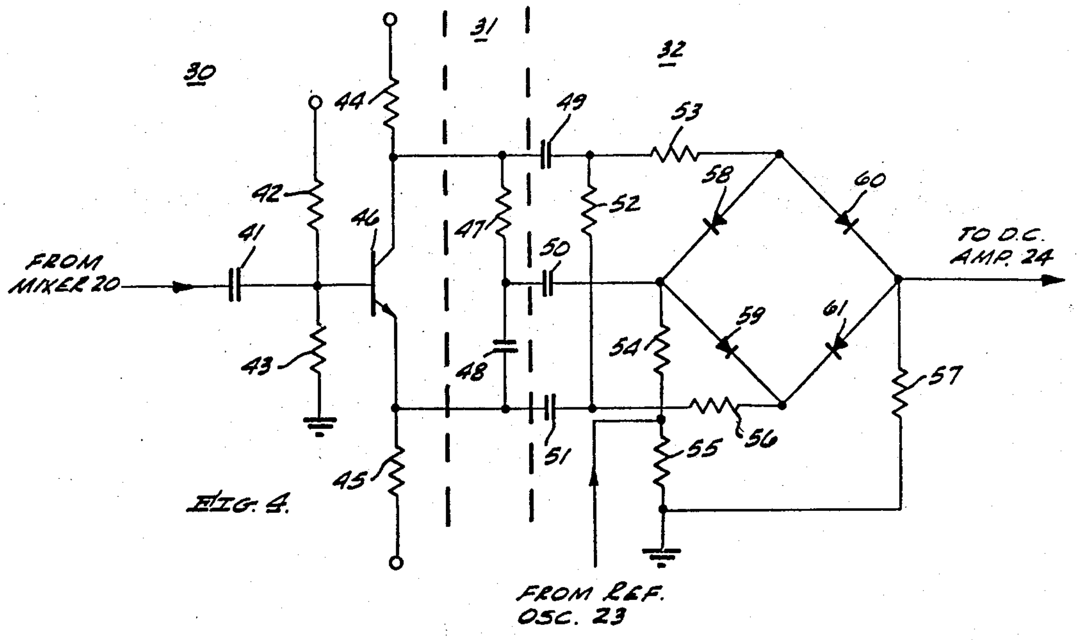
FIG. 4 is a schematic diagram of the phase discatector circuit shown in FIG. 3.

FIG. 4 is a schematic representation of a preferred circuit implementing the phase discatector of FIG. 3. Like reference numerals have been carried over from FIG. 3 to designate the functional blocks described above. The broken line segments in FIG. 4 correspond to the designated functional blocks.

The phase splitter network comprises an input capacitor 41 coupled to bias resistors 42 and 43 and to transistor 46. Resistors 44 and 45 are bias resistors coupled to the transistor 46. The phase splitter network may be any conventional circuit that provides two output signals 180 degrees out-of-phase. A transformer, for example, can also be employed as an alternative.

The phase shifter 31 is coupled to the phase splitter 30 as described above in FIG. 3. The phase shifter consists of resistor 47 and capacitor 48. Their values are determined by the frequency at which a 90° phase shift is desired.

The bridge network is a conventional diode bridge circuit. Capacitors 49, 50 and 51 are coupling capacitors for the diode bridge network. Resistor 52 serves as a d-c return for the diodes. Resistor 55 serves as the termination resistance for the input line from the reference oscillator. Resistor 54, in conjunction with the impedance presented by the output of the phase shifter 31 forms the summing network 33 shown in FIG. 3.

In all cases it is understood that the above-described embodiments are merely illustrative of but a small number of the many possible specific embodiments which can represent applications of the principles of the present invention. Numerous and varied other arrangments can be readily devised in accordance with these principles by those skilled in the art without departing from the spirit and scope of the invention.

What is claimed is:

1. A phase discatector circuit functioning as a frequency discriminator circuit for input signals having frequencies removed from a predetermined lock-on frequency and functioning as a phase detector after said predetermined lock-on frequency has been acquired comprising, in combination:

a phase splitter having an input port and a pair of push-pull output ports;

circuit input means coupled to said input port of said phase splitter;

a phase shifter having a pair of push-pull input ports and an output port, the output of said phase shifter having a phase between 0° and 180° depending upon the frequency of said input signal;

a summing network having a pair of input ports and an output port, the first input port being coupled to said phase shifter output and a second input port being coupled to a source of reference signals;

a diode bridge network having a pair of push-pull input ports, a third input port coupled to said summing network output port, and an output port for providing an output signal whenever said input signal frequency and phase vary from said reference signal frequency and phase respectively; and means for coupling said push-pull output ports of said phase splitter to said push-pull input ports of said phase shifter and said diode bridge network, respectively.

2. The phase discatector circuit according to claim 1 wherein said phase splitter comprises:

a transistor having at least a base, emitter and collector electrodes, and wherein said base electrode is coupled to one of said input ports, and said emitter and collector electrodes are coupled to said phase shifter.

3. The phase discatector circuit according to claim 2 wherein said phase shifter comprises:

a series connected resistor and capacitor coupled to said emitter and collector terminals of said transistor.

4. The phase discatector circuit according to claim 3 wherein said summing network comprises:

first and second resistors in series connection having said source of reference signals coupled to the junction of said first and second resistors.

* * * * *